United States Patent
Hsiao

(10) Patent No.: US 9,732,758 B2
(45) Date of Patent: Aug. 15, 2017

(54) CONTROL DEVICE AND CONTROL METHOD

(71) Applicant: Accton Technology Corporation, Hsinchu (TW)

(72) Inventor: Guo-Siang Hsiao, Mailiao Township (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 335 days.

(21) Appl. No.: 14/445,136

(22) Filed: Jul. 29, 2014

(65) Prior Publication Data

US 2015/0275909 A1    Oct. 1, 2015

(30) Foreign Application Priority Data

Mar. 28, 2014    (TW) .............................. 103111647 A

(51) Int. Cl.
*F04D 27/00*    (2006.01)
*F04D 19/00*    (2006.01)
*F04D 25/06*    (2006.01)

(52) U.S. Cl.
CPC .......... *F04D 27/004* (2013.01); *F04D 19/002* (2013.01); *F04D 25/06* (2013.01);
(Continued)

(58) Field of Classification Search
CPC  F04B 49/065; F04B 2205/10; F04B 2205/11; F04D 19/002; F04D 25/06;
(Continued)

(56) References Cited

U.S. PATENT DOCUMENTS 4,813,241 A  *  3/1989  Hurutachi ................. F25B 5/00
                                                            62/209
4,817,865 A  *  4/1989  Wray ..................... H05K 7/207
                                                            165/247
(Continued)

FOREIGN PATENT DOCUMENTS

CN    1477471 A    2/2004
CN    1812705 A    8/2006
(Continued)

OTHER PUBLICATIONS

Texas Nstruments, and (National Semiconductor). LM34 Precision Farenheit Temperature Sensors. SNIS16D: Mar. 2000. Print.*

*Primary Examiner* — Devon Kramer
*Assistant Examiner* — Joseph Herrmann
(74) *Attorney, Agent, or Firm* — Birch, Stewart, Kolasch & Birch, LLP

(57) ABSTRACT

A control device, applied to a fan, including a first temperature sensing circuit, a second temperature sensing circuit and a driving circuit. The first temperature sensing circuit is arranged to output an enable signal when the temperature is higher than a first threshold temperature. The driving circuit is enabled by the enable signal, and arranged to output a driving signal with a first driving voltage level to drive the fan. The second temperature sensing circuit is arranged to adjust the driving signal output by the driving circuit from the first driving voltage level to a second driving voltage level so as to adjust the rotation speed of the fan.

4 Claims, 2 Drawing Sheets

(52) U.S. Cl.
CPC ....... *F04D 25/0613* (2013.01); *F04D 27/001* (2013.01); *F05D 2270/303* (2013.01)

(58) Field of Classification Search
CPC ............. F04D 25/0606; F04D 25/0613; F04D 25/0666; F04D 25/08; F04D 27/001; F04D 27/004; F04D 27/008; F04D 29/5806; F04D 29/813; F04D 29/588; F05B 2270/303; F05B 2270/3032; F05B 2270/325; F05D 2270/303; F05D 2270/3032; F05D 2270/325
USPC .......................................................... 417/32
See application file for complete search history.

(56) References Cited

U.S. PATENT DOCUMENTS

| | | | |
|---|---|---|---|
| 5,197,858 A * | 3/1993 | Cheng | F04D 27/004 318/473 |
| 5,469,320 A | 11/1995 | Walker et al. | |
| 5,769,705 A | 6/1998 | O'Callaghan et al. | |
| 6,385,395 B1 * | 5/2002 | Horng | H02P 6/08 388/809 |
| 6,396,231 B1 * | 5/2002 | Horng | F04D 27/004 318/461 |
| 7,394,215 B2 * | 7/2008 | Tsai | F04D 27/004 318/456 |
| 2007/0133955 A1 * | 6/2007 | Hsu | F04D 27/004 388/811 |
| 2008/0009980 A1 | 1/2008 | Chang et al. | |
| 2012/0109405 A1 | 5/2012 | Chan et al. | |

FOREIGN PATENT DOCUMENTS

| | | |
|---|---|---|
| CN | 101169665 A | 4/2008 |
| CN | 102444602 A | 5/2012 |
| CN | 202579254 U | 12/2012 |
| CN | 103036202 A | 4/2013 |
| JP | 58-162799 A | 9/1983 |
| JP | 2004-278438 A | 10/2004 |
| TW | 200743942 A | 12/2007 |
| TW | 201133169 A1 | 10/2011 |

\* cited by examiner

CONTROL DEVICE AND CONTROL METHOD

CROSS REFERENCE TO RELATED APPLICATIONS

This Application claims priority of Taiwan Patent Application No. 103111647, filed on Mar. 28, 2014, the entirety of which is incorporated by reference herein.

BACKGROUND OF THE INVENTION

Field of the Invention

The present invention relates to a control device and in particular to a control device applied to a fan and the control device turns on the fan and adjusts the rotation speed of the fan according to temperature.

Description of the Related Art

The temperature inside an electronic device will rise when the electronic device is operating. High temperature leads to the low working efficiency of the electronic device. In order to enhance working efficiency, typically, a fan is installed with the electronic device to lower the temperature inside the electronic device. Conventionally, a CPU continuously senses the environmental temperature, and dynamically adjusts the rotation speed of the fan according to the sensing result. However, this way will sacrifice a part of source of the CPU, resulting in the low efficiency of the CPU. Therefore, there is a need to provide a new control device implemented by hardware, such that the operation used to control the fan is performed without the CPU so as to enhance the efficiency of the CPU.

BRIEF SUMMARY OF THE INVENTION

In view of this, an exemplary embodiment of the invention provides a control device applied to a fan. The control device includes a first temperature sensing circuit, arranged to output an enable signal when the temperature is higher than a first threshold temperature. The control device further includes a driving circuit, enabled by the enable signal, and arranged to output a driving signal with a first driving voltage level to drive the fan. The control device further includes a second temperature sensing circuit, arranged to adjust the driving signal output by the driving circuit from the first driving voltage level to a second driving voltage level so as to adjust rotation speed of the fan.

In an exemplary embodiment of the invention, the first temperature sensing circuit comprises a first thermal element and a first resistor, which are arranged to sense the temperature and output a first sensing voltage corresponding to the sensed temperature. The first temperature sensing circuit further comprises a first voltage divider circuit, arranged to supply a first reference voltage corresponding to the first threshold temperature. The first temperature sensing circuit further comprises a first comparator, arranged to receive both the first sensing voltage and the first threshold voltage and to compare the first sensing voltage with the first threshold voltage so as to output the enable signal.

In an exemplary embodiment of the invention, the driving circuit comprises a DC-DC converter, having an enable terminal coupled to the first comparator to receive the enable signal, having a feedback terminal, and having a driving terminal coupled to the fan and outputting the driving signal to the fan. The driving circuit further comprises a second resistor; one terminal of the second resistor is coupled to the driving terminal, and the other terminal of the second resistor is coupled to the feedback terminal. The driving circuit further comprises a third resistor; one terminal of the third resistor is coupled to the feedback terminal, and the other one terminal is coupled to a ground node, wherein the DC-DC converter adjusts the voltage level of the driving signal according to the voltage level of the feedback terminal.

In an exemplary embodiment of the invention, the second temperature sensing circuit comprises a second thermal element and a fourth resistor, which are arranged to sense the temperature and output a second sensing voltage corresponding to the sensed temperature. The second temperature sensing circuit further comprises a second voltage divider circuit, arranged to supply a second reference voltage corresponding to the second threshold temperature. The second temperature sensing circuit further comprises a second comparator, arranged to receive both the second sensing voltage and the second threshold voltage and to compare the second sensing voltage with the second threshold voltage so as to output a control signal. The second temperature sensing circuit further comprises a switch device, coupled to both the second comparator and the feedback terminal. The second temperature sensing circuit further comprises a fifth resistor; wherein one terminal of the fifth resistor is coupled to the switch device. and the other terminal of the fifth resistor is coupled to the ground node.

Another embodiment of the invention provides a control method, applied to a control device with a first temperature sensing circuit, a driving circuit and a second temperature sensing circuit, the control device being further applied to a fan. The control method comprises outputting an enable signal by the first temperature sensing circuit when temperature is higher than a first threshold temperature. The control method further comprises outputting a driving signal with a first driving voltage level by the driving circuit based on the enable signal to drive the fan. The control method further comprises adjusting the driving signal, output by the driving circuit, from the first driving voltage level to a second driving voltage level by the second temperature sensing circuit when the temperature is higher than a second threshold temperature so as to adjust the rotation speed of the fan.

The aforementioned control device and the control method of the invention turn on the fan and adjust the rotation speed of the fan by sensing the temperature without the CPU, further enhancing the efficiency of the CPU.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
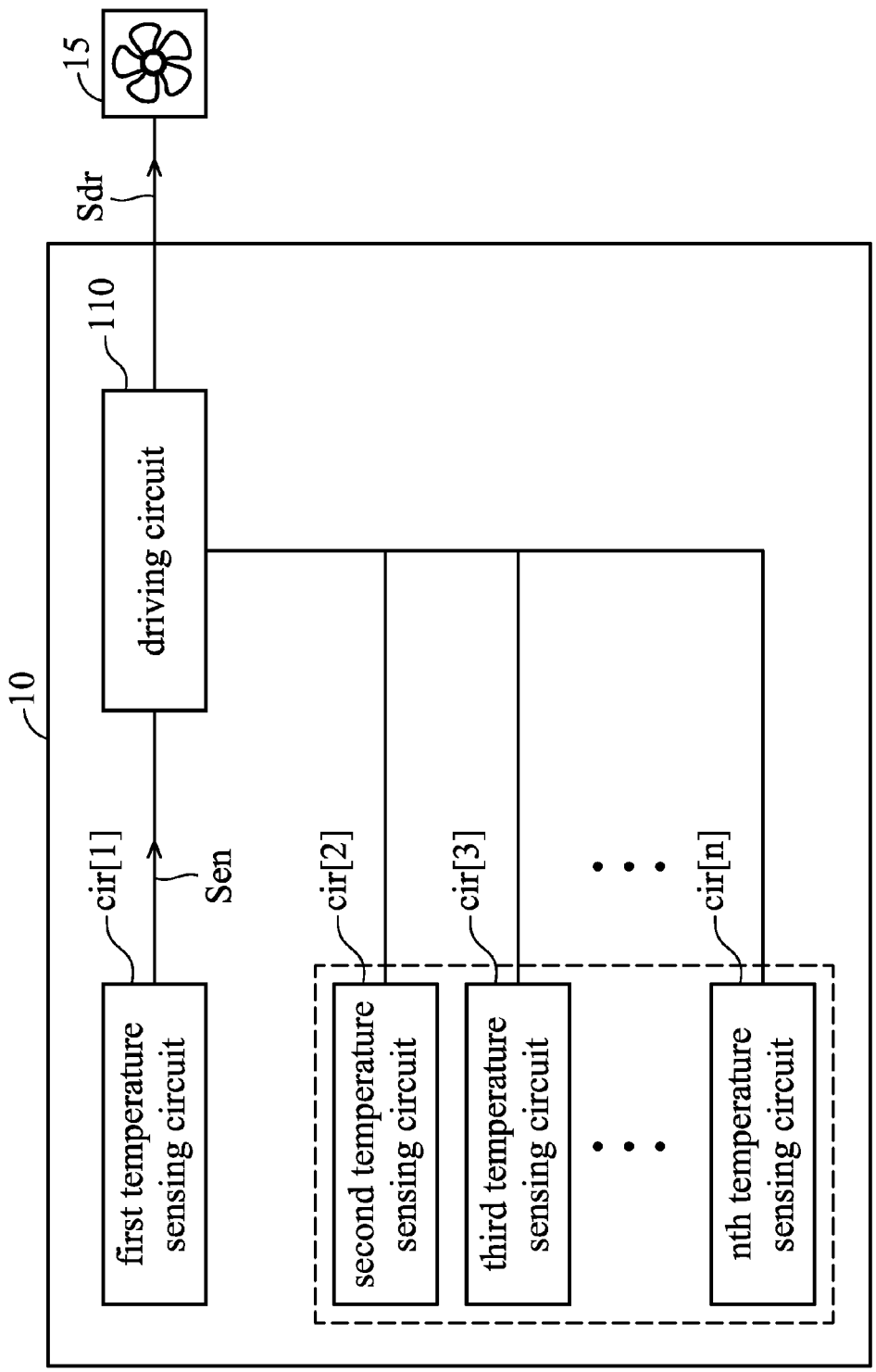
FIG. 1 is a diagram illustrating a control device coupled to a fan, according to an exemplary embodiment of the invention.

As the present invention allows for various changes and numerous embodiments, particular embodiments will be illustrated in the drawings and described in detail in the written description. However, this is not intended to limit the present invention to particular modes of practice, and it should be appreciated that all changes, equivalents, and substitutes that do not depart from the spirit and technical scope of the invention are encompassed in the present invention. Like reference numerals in the drawings denote like elements. In the accompanying drawings, the dimensions of structures are exaggerated for clarity.

While such terms as "first", "second", and the like may be used to describe various elements, such elements should not be limited to the above terms. The above terms are used only to distinguish one element from another. For example, a first element may be referred to as a second element without departing from the scope of rights of the present disclosure, and likewise a second element may be referred to as a first element.

In the following description, technical terms are used only to explain a specific exemplary embodiment without limiting the present invention. The terms of a singular form may include plural forms unless the contrary is indicated. The meaning of "include", "comprise", "including", or "comprising" specifies a property, a figure, a process, an operation, a component, a part, or combinations thereof but does not exclude other properties, figures, processes, operations, components, parts, or combinations thereof.

Unless otherwise defined, all terms including technical and scientific terms used herein have the same meaning as commonly understood by one of ordinary skill in the art to which this inventive concept belongs. It will be further understood that terms such as those defined in commonly used dictionaries should be interpreted as having a meaning that is consistent with their meaning in the context of the relevant art and will not be interpreted in an idealized or overly formal sense unless expressly so defined herein.

FIG. 1 is a diagram illustrating a control device 10 coupled to a fan 15, according to an exemplary embodiment of the invention. The control device 10 comprises a first temperature sensing circuit cir[1], a second temperature sensing circuit cir[2], a third temperature sensing circuit cir[3]~an nth temperature sensing circuit cir[n] and a driving circuit 110, wherein n is positive integer. The first temperature sensing circuit cir[1]~nth temperature sensing circuit cir[n] are coupled to the driving circuit 110.

The driving circuit 110 is coupled to the fan 15. The driving circuit 110 is enabled by the enable signal Sen to output a driving signal Sdr with a first driving voltage level to drive the fan 15.

It is worthy of note that the functions of the first temperature sensing circuit cir[1] is different from the second temperature sensing circuit cir[2]—the nth temperature sensing circuit cir[n], and the second temperature sensing circuit cir[2]~the nth temperature sensing circuit cir[n] possess similar functions. In more specific terms, the first temperature sensing circuit cir[1] is arranged to sense the temperature, and arranged to output the enable signal Sen to enable the driving circuit 110 when the sensed temperature is higher than a first threshold temperature. The second temperature sensing circuit cir[2] is arranged to sense the temperature, and arranged to adjust the driving signal Sdr output by the driving circuit 110 from the first driving voltage level to a second driving voltage level so as to adjust the rotation speed of the fan 15. Similarly, the third temperature sensing circuit cir[3] is arranged to sense the temperature, and arranged to adjust the driving signal Sdr output by the driving circuit 110 from the second driving voltage level to a third driving voltage level so as to adjust the rotation speed of the fan 15, and so on.

In a specific embodiment of the control device 10. A circuit designer designed that an nth threshold temperature is higher than an n−1th threshold temperature, . . . , a third threshold temperature is higher than a second threshold temperature, and a second threshold temperature is higher than a first threshold temperature. For example, the nth threshold temperature is 100° C., the n−1th threshold temperature is 95° C., and so on. In this embodiment, it is assumed that when temperature is higher than nth threshold temperature, the driving voltage to the fan is gradually raised from a first driving voltage level to an nth driving voltage level to increase the rotation speed of the fan. For example, the first driving voltage level is 3 V, the second driving voltage level is 5 V, the third driving voltage level is 7 V, and so on. By this way, the control device 10 of the invention has the characteristic of multistage adjustments to the rotation speed of the fan. The various values mentioned above are only exemplary, and do not refer to a value or sequence generated when the control device of the invention is operating.

Figure 2:
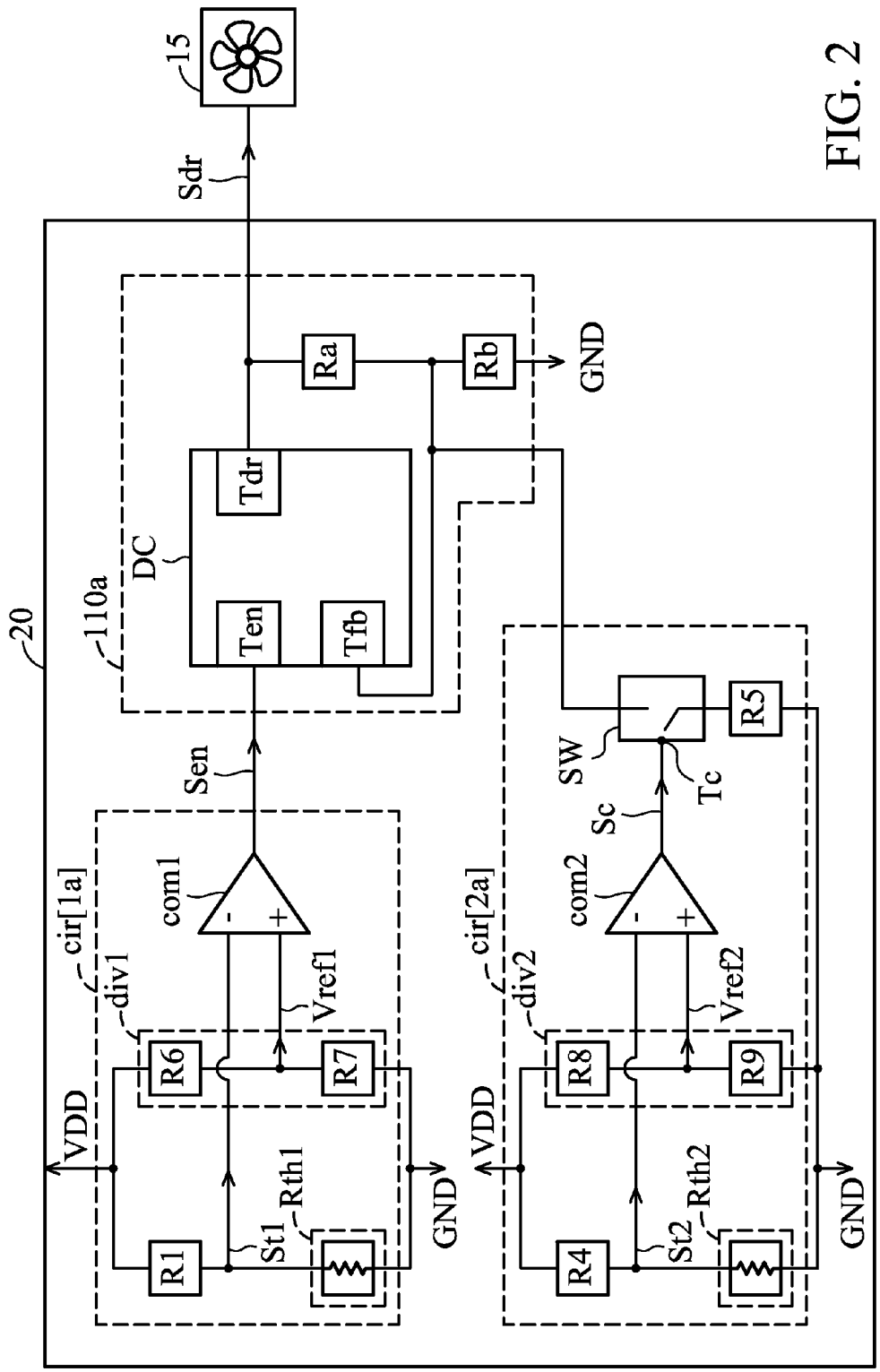
FIG. 2 is a diagram illustrating a control device coupled to a fan, according to an exemplary embodiment of the invention.

FIG. 2 is a diagram illustrating a control device 20 coupled to a fan 15, according to an exemplary embodiment of the invention. The difference between FIG. 2 and FIG. 1 is that FIG. 2 further discloses the detail of the control device 10 of FIG. 1. A driving circuit 110 a of FIG. 2 corresponds to the driving circuit 110 of FIG. 1, a first temperature sensing circuit cir[1a] of FIG. 2 corresponds to the first temperature sensing circuit cir[1] of FIG. 1. A second temperature sensing circuit cir[2a] of FIG. 2 may be one of the second temperature sensing circuit cir[2]~the nth temperature sensing circuit cir[n] in FIG. 1. For simplicity, FIG. 2 only shows the second temperature sensing circuit cir[2a] corresponding to the second temperature sensing circuit cir[2] of FIG. 1.

The driving circuit 110 further comprises a DC-DC converter DC, a second resistor Ra, and a third resistor Rb. The DC-DC converter DC has an enable terminal Ten, a feedback terminal Tfb and a driving terminal Tdr coupled to the fan 15. One terminal of the second resistor Ra is connected to the third resistor Rb in series. After being connected in series, the second resistor Ra and the third resistor Rb are coupled between the driving terminal Tdr and a ground node GND. The connection node between the second resistor Ra and the third resistor Rb is coupled to the feedback terminal Tfb. The other terminal of the second resistor Ra is connected to the driving terminal Tdr. According to the voltage level of the feedback terminal Tfb, the driving circuit 110 adjusts the voltage level of the driving voltage Sdr.

The first temperature sensing circuit cir[1a] comprises a first thermal component Rth1, a first resistor R1, a first voltage divider circuit div1 and a first comparator com1. The first thermal component Rth1 and the first resistor R1 are connected in series. After connecting in series, the first thermal component Rth1 and the first resistor R1 are coupled between a power node VDD and the ground node GND. The first comparator com1 has a first input terminal ("−"), a second input terminal ("+") and an output terminal.

In a specific embodiment, the first voltage divider circuit div1 comprises a sixth resistor R6 and a seventh resistor R7. The sixth resistor R6 and the seventh resistor R7 are connected in series. After connecting in series, the sixth resistor R6 and the seventh resistor R7 are coupled between the power node VDD and the ground node GND. The first voltage divider circuit div1 is arranged to supply a first reference voltage Vref1 corresponding to the first threshold temperature. For example, a circuit designer selects a resistance ratio between the sixth resistor R6 and the seventh resistor R7 according to requirements, such that the voltage level of the first reference voltage Vref1 is in response to the threshold temperature that the circuit designer wants.

The circuit designer may change the arrangement between the first thermal component Rth1 and the first resistor R1. Two types of arrangement are described in detail below.

The first type is interpreted below. The first resistor R1 is coupled between the power node VDD and the first comparator com1, and the first thermal component Rth1 is coupled between the first comparator com1 and the ground node GND.

In the first type, if the first thermal component Rth1 is a thermal resistor with negative temperature coefficient, then, as shown in FIG. 2, the connection node between the first thermal component Rth1 and the first resistor R1 is coupled to the first input terminal ("−") of the first comparator com1, and the connection node between the sixth resistor R6 and the seventh resistor R7 is coupled to the second terminal ("+") of the first comparator com1. The first thermal component Rth1 and the first resistor R1 are arranged to sense the temperature and to output a first sensing voltage SU corresponding to the sensed temperature at the connection node of the first thermal component Rth1 and the first resistor R1. The first input terminal ("−") of the first comparator com1 receives the first sensing voltage St1. The second terminal ("+") of the first comparator com1 receives the first reference voltage vref1. The output terminal outputs the enable signal Sen. In more specific terms, the first sensing voltage St1 becomes lower when the temperature becomes higher. Therefore, the first comparator com1 outputs the enable signal Sen when the first sensing voltage St1 is lower than the first reference voltage vref1 due to the temperature increase. In other words, the first comparator com1 outputs the enable signal Sen when the temperature sensed by the first thermal component Rth1 is higher than the first threshold temperature.

Alternatively, in the first type, if the first thermal component Rth1 is a thermal resistor with positive temperature coefficient, then the connection node between the first thermal component Rth1 and the first resistor R1 is coupled to the second input terminal ("+") of the first comparator com1 and the connection node between the sixth resistor R6 and the seventh resistor R7 is coupled to the first terminal ("−") of the first comparator com1. The second input terminal ("+") of the first comparator com1 receives the first sensing voltage St1. The first terminal ("−") of the first comparator com1 receives the first reference voltage vref1. In more specific terms, the first sensing voltage St1 becomes higher when the temperature becomes higher. Therefore, the first comparator com1 outputs the enable signal Sen when the first sensing voltage St1 is higher than the first reference voltage vref1 due to the temperature increase. In other words, the first comparator com1 outputs the enable signal Sen when the temperature sensed by the first thermal component Rth1 is higher than the first threshold temperature.

The second type is interpreted below. The first thermal component Rth1 is coupled between the power node VDD and the first comparator com1, and the first resistor R1 is coupled between the first comparator com1 and the ground node GND. If the first thermal component Rth1 is a thermal resistor with negative temperature coefficient, then the connection node between the first thermal component Rth1 and the first resistor R1 is coupled to the second input terminal ("+") of the first comparator com1, and the connection node between the sixth resistor R6 and the seventh resistor R7 is coupled to the first terminal ("−") of the first comparator com1. The second input terminal ("+") of the first comparator com1 receives the first sensing voltage St1. The first terminal ("−") of the first comparator com1 receives the first reference voltage vref1. In more specific terms, the first sensing voltage St1 becomes higher when the temperature becomes higher. Therefore, the first comparator com1 outputs the enable signal Sen when the first sensing voltage St1 is higher than the first reference voltage vref1 due to the temperature increase. In other words, the first comparator com1 outputs the enable signal Sen when the temperature sensed by the first thermal component Rth1 is higher than the first threshold temperature.

Alternatively, if the first thermal component Rth1 is a thermal resistor with positive temperature coefficient, the connection node between the first thermal component Rth1 and the first resistor R1 is coupled to the first input terminal ("−") of the first comparator com1, and the connection node between the sixth resistor R6 and the seventh resistor R7 is coupled to the second terminal ("+") of the first comparator com1. The first input terminal ("−") of the first comparator com1 receives the first sensing voltage St1. The second terminal ("+") of the first comparator com1 receives the first reference voltage vref1. In more specific terms, the first sensing voltage St1 becomes lower when the temperature becomes higher. Therefore, the first comparator com1 outputs the enable signal Sen when the first sensing voltage St1 is lower than the first reference voltage vref1 due to the temperature increase. In other words, the first comparator com1 outputs the enable signal Sen when the temperature sensed by the first thermal component Rth1 is higher than the first threshold temperature. The above types of implementation disclose the different combination of design, but the invention is not limited thereto.

The second temperature circuit cir[2a] and the first temperature circuit cir[1a] are much the same. The second temperature circuit cir[2a] comprises a second thermal component Rth2 which is a thermal resistor with negative temperature coefficient, a fourth resistor R4, a second voltage divider circuit div2 and a second comparator com2. The difference between the second temperature circuit cir[2a] and the first temperature circuit cir[1a] is that the second temperature circuit cir[2a] further comprises a switch device SW and a fifth resistor R5.

The second thermal component Rth2 and the fourth resistor R4 are connected in series. After connecting in series, the second thermal component Rth2 and the fourth resistor R4 are coupled between the power node VDD and the ground node GND. In a specific embodiment, the second voltage divider circuit div2 comprises an eighth resistor R8 and a ninth resistor R9. The eighth resistor R8 and the ninth resistor R9 are connected in series. After connecting in series, the eighth resistor R8 and the ninth resistor R9 are coupled between the power node VDD and the ground node GND. The second comparator com2 has a first input terminal ("−"), a second input terminal ("+") and an output terminal. The first input terminal ("−") is coupled to the connection node between the second thermal component Rth2 and the fourth resistor R4, the second input terminal ("+") is coupled to the connection node between the eighth resistor R8 and the ninth resistor R9. The switch device SW is coupled to both of the third resistor Rb and the feedback terminal Tfb. The switch device SW further has a control terminal Tc coupled to the output terminal of the second comparator com2. Based on the output signal output by the second comparator com2, it is determined whether to turn on the switch device SW to form the connection between the fifth resistor R5 and the third resistor Rb. The switch device SW and the fifth resistor R5 are connected in series. After connecting in series, the switch device SW and the fifth resistor R5 are coupled between the feedback terminal Tfb and the ground node GND.

The operation of the front-stage of the second temperature circuit cir[2a] (comprising the second thermal component Rth2, the fourth resistor R4, the second divider circuit div2 and the second comparator com2) is the same as the above first temperature circuit cir[1a]. Briefly, a second sensing voltage St2 is in response to the temperature sensed by the second thermal component Rth2. A circuit designer selects resistance ratio between the eighth resistor R8 and the ninth resistor R9 according to a second threshold temperature, such that the voltage level of the second reference voltage Vref2 is in response to the second threshold temperature. In this embodiment, the second comparator com2 outputs a control signal Sc to turn on the switch device SW when the second sensing voltage St2 is lower than the second reference voltage Vref2. In other words, the second comparator com2 outputs the control signal Sc when the temperature sensed by the second thermal component Rth2 is higher than the second threshold temperature.

When the second comparator com2 outputs the control signal Sc to turn on the switch device SW, the fifth resistor R5 is connected to the feedback terminal Tfb such that the fifth resistor R5 of the second temperature circuit cir[2a] and the third resistor Rb are connected in parallel. After connecting in parallel, the voltage level of the feedback terminal Tfb is changed with the variation of the resistance due to parallel connection. Based on the description to the above driving circuit 110a (the driving circuit 110a adjusts the voltage level of the driving signal Sdr, according to the voltage level of the feedback terminal Tfb), the output of the driving circuit 110a is adjusted from the first driving voltage level to the second driving voltage level to adjust the rotation speed of the fan 15.

In a specific embodiment, the control device 20 of FIG. 2 comprises a plurality of the temperature sensing circuit whose circuit structure is similar with the second temperature circuit cir[2a], but, with respect to different temperature condition, those temperature sensing circuits comprise the different thermal component, the different divider voltage circuit and the different resistor that will be connected to the third resistor Rb in parallel. By this way, the control device 20 may, according to the different threshold temperatures set up by the plurality of the temperature sensing circuits, combine the different thermal components with the different corresponding resistors and the different divider voltage circuits, such that the different switch devices corresponding to the different temperatures are turned on and therefore the different resistors are connected to the third resistor Rb in parallel so as to correspondingly adjust the voltage level of the feedback terminal Tfb. In this way, the driving circuit 110a generates the different driving voltages to adjust the rotation speed of the fan. In other words, the control device 20 of the invention has the feature of multistage adjustments to the rotation speed of the fan.

In an embodiment of the invention, the switch device SW may be NPN bipolar junction transistor (BJT), but it is not limited thereto. The switch device SW may also be a switch component such as field-effect transistor or relay. When the switch device SW is NPN BJT, the base is coupled to the output terminal of the second comparator com2, the emitter is coupled to the third resistor Rb, and the collector is coupled to the fifth resistor R5.

The control device 10 and the control device 20 of the invention are able to sense the temperature, and, according to the sensing result, turn on the fan and adjust the rotation speed of the fan without the CPU performing computations. Therefore, the efficiency of the CPU is enhanced.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A control device, applied to a fan, comprising:
    a first temperature sensing circuit, arranged to output an enable signal when a sensed temperature is higher than a first threshold temperature;
    a driving circuit, enabled by the enable signal, and arranged to output a driving signal with a first driving voltage level to drive the fan; and
    a second temperature sensing circuit, arranged to adjust the driving signal output by the driving circuit from the first driving voltage level to a second driving voltage level so as to adjust rotation speed of the fan when the sensed temperature is higher than a second threshold temperature,
    wherein the first temperature sensing circuit comprises:
        a first thermal element and a first resistor, which are arranged to sense the temperature and output a first sensing voltage corresponding to the sensed temperature;
        a first voltage divider circuit, arranged to supply a first reference voltage corresponding to the first threshold temperature; and
        a first comparator, arranged to receive and to compare the first sensing voltage with the first threshold voltage so as to output the enable signal; and
    wherein the driving circuit comprises:
        a DC-DC converter, having an enable terminal coupled to the first comparator to receive the enable signal, having a feedback terminal, and having a driving terminal coupled to the fan and outputting the driving signal to the fan;
        a second resistor; wherein one terminal of the second resistor is coupled to the driving terminal, and the other terminal of the second resistor is coupled to the feedback terminal; and
        a third resistor; wherein one terminal of the third resistor is coupled to the feedback terminal, and the other terminal of the third resistor is coupled to a ground node, wherein the DC-DC converter adjusts the voltage level of the driving signal, according to the voltage level of the feedback terminal, and
    wherein the second temperature sensing circuit comprises:
        a second thermal element and a fourth resistor, which are arranged to sense the temperature and output a second sensing voltage corresponding to the sensed temperature;
        a second voltage divider circuit, arranged to supply a second reference voltage corresponding to the second threshold temperature;

a second comparator, arranged to receive and to compare the second sensing voltage with the second threshold voltage so as to out a control signal;
a switch device, coupled to both the second comparator and the feedback terminal; and
a fifth resistor; wherein one terminal of the fifth resistor is coupled to the switch device, and the other terminal of the fifth resistor is coupled to the ground node, wherein the switch device couples the fifth resistor and the feedback terminal based on the control signal.

2. The control device as claimed in claim 1, wherein the second comparator outputs the control signal to turn on the switch device when the sensed temperature is higher than the second threshold temperature, such that the fifth resistor is connected to the third resistor of the driving circuit in parallel.

3. A control method, applied to a control device with a first temperature sensing circuit, a driving circuit and a second temperature sensing circuit, the control device further being applied to a fan, the control method comprising:
outputting an enable signal by the first temperature sensing circuit when a sensed temperature is higher than a first threshold temperature;
outputting a driving signal with a first driving voltage level by the driving circuit based on the enable signal to drive the fan;
adjusting the driving signal, output by the driving circuit, from the first driving voltage level to a second driving voltage level by the second temperature sensing circuit so as to adjust rotation speed of the fan when the sensed temperature is higher than a second threshold temperature;
sensing temperature and outputting a first sensing voltage corresponding to the sensed temperature by a first thermal component and a first resistor of the first temperature sensing circuit;
generating a first reference voltage corresponding to the first threshold temperature by a first voltage divider circuit of the first temperature sensing circuit;
receiving and comparing the first sensing voltage with the first reference voltage so as to output the enable signal by a first comparator of the first temperature sensing circuit;
receiving the enable signal from the first comparator via an enable terminal of a DC-DC converter of the driving circuit;
outputting the driving signal to the fan via a driving terminal of the DC-DC converter;
returning the driving signal from the driving terminal to a feedback terminal by a second resistor and a third resistor of the driving circuit;
sensing the temperature and outputting a second sensing voltage corresponding to the sensed temperature by a second thermal component and a fourth resistor of the second temperature sensing circuit;
generating a second reference voltage corresponding the second threshold temperature by a second voltage divider circuit of the second temperature sensing circuit;
receiving and comparing the second sensing voltage with the second reference voltage so as to output a control signal by a second comparator of the second temperature sensing circuit;
coupling a fifth resistor of the second temperature sensing circuit and to the feedback terminal based on the control signal by a switch device of the second temperature sensing circuit; and
adjusting the driving signal based on the voltage level of the feedback terminal by the DC-DC converter.

4. The control method as claimed in claim 3, further comprising: the second comparator outputs the control signal to turn on the switch device, such that the fifth resistor and the third resistor of the driving circuit are connected in parallel when the sensed temperature is higher than the second threshold temperature.

* * * * *